March 20, 1956 R. H. McELROY 2,738,825
APPARATUS FOR MAKING A CERAMIC TILE BUILDING PANEL
Filed May 3, 1954 2 Sheets-Sheet 1
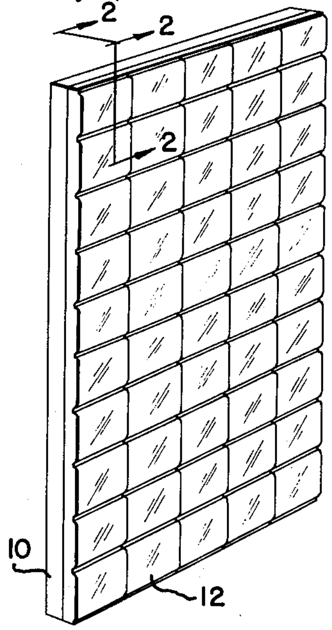
FIG.-1
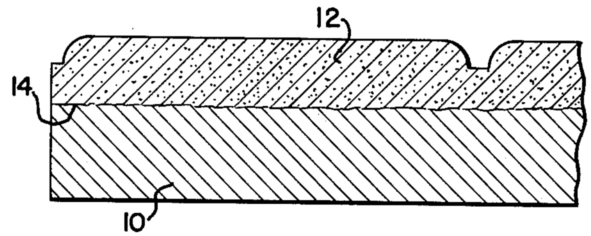
FIG.-2
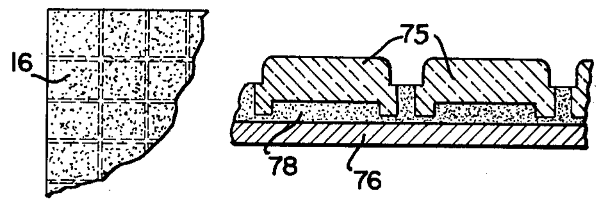
FIG.-3
FIG.-8
FIG.-4
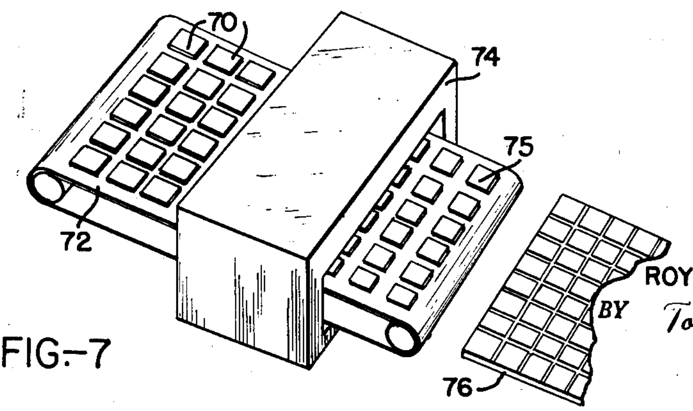
FIG.-7
*INVENTOR.*
ROY H. McELROY
BY *Toulmin & Toulmin*
ATTORNEYS APPARATUS FOR MAKING A CERAMIC TILE BUILDING PANEL
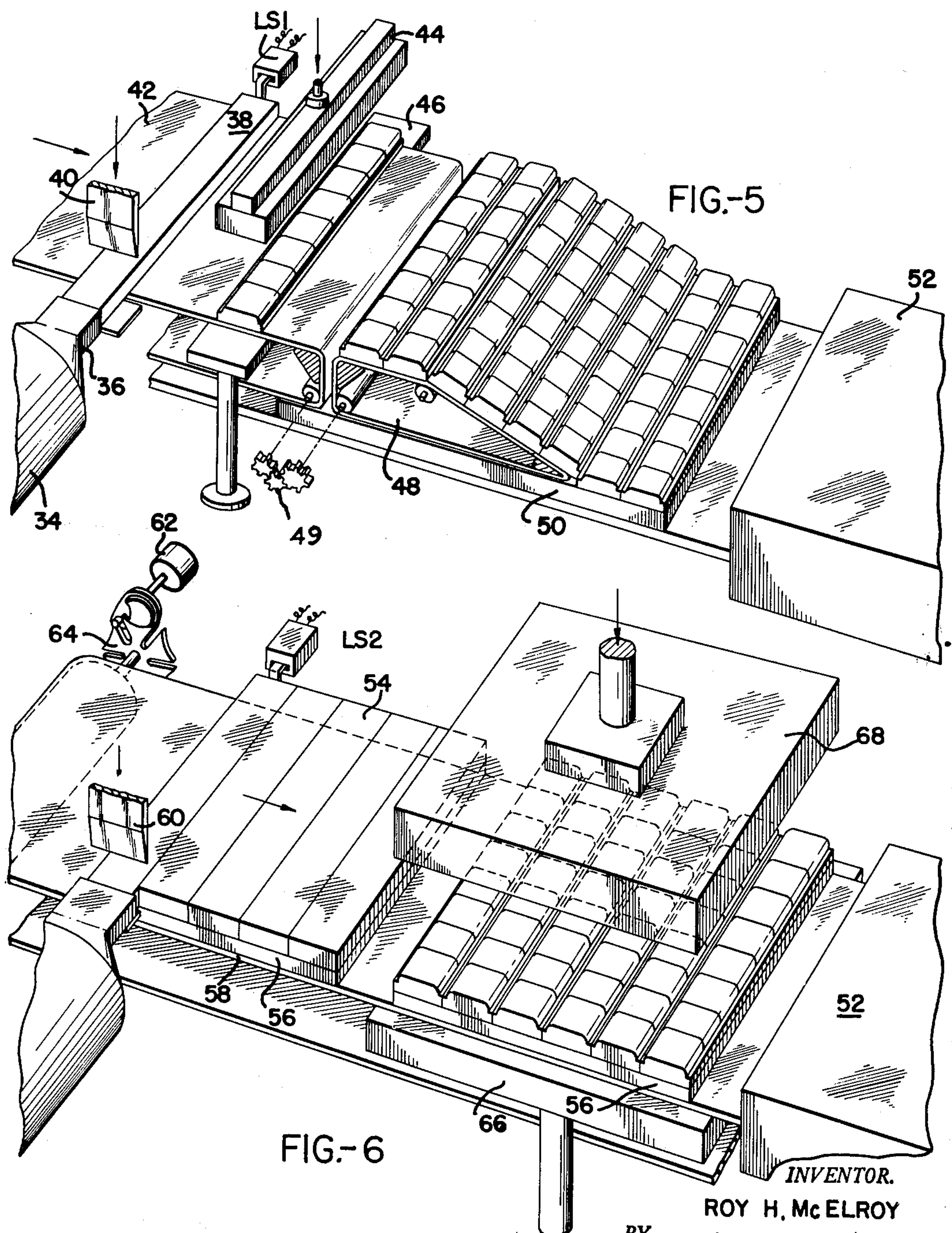
INVENTOR.
ROY H. McELROY
BY Toulmin & Toulmin
ATTORNEYS 2,738,825

APPARATUS FOR MAKING A CERAMIC TILE BUILDING PANEL

Roy H. McElroy, Dayton, Ohio, assignor to International Clay Machinery of Delaware, Inc., Dayton, Ohio, a corporation of Delaware Application May 3, 1954, Serial No. 427,197

4 Claims. (Cl. 154—1)

This invention relates to a tile product and a method of manufacturing such a product, and in particular to a composite tile article of the nature of a wallboard.

At the present time in the construction art, most tile-work is set on the job with the tiles being put in place individually and retained by a suitable tile cement. Certain simulated tile wallboards or wall coverings have been made, but these generally consist of an embossed metal sheet having an enamel coating or a linoleum-like material likewise formed with an enamel coating, or a pressed wood scored to represent tile and also enameled. Such wall coverings and wallboards are satisfactory for certain uses, but all are characterized in being markedly lacking in appearance and durability, as compared to ceramic tile.

With the foregoing in mind, it is a primary object of the present invention to provide a wallboard or the like characterized in having a surface composed of ceramic tile, either in the form of individual tiles or of a larger tile subdivided or embossed so as to appear to be made up of a plurality of individual tiles.

Another object of this invention is the provision of a method of manufacturing a wallboard of the type referred to above.

A still further object of this invention is the provision of a method of manufacturing a wallboard or the like having a surface of ceramic tile in which the tile is fired and bonded to a backing sheet in a single operation.

A still further object of this invention is the provision of a process of manufacturing a wallboard or the like having a ceramic tile facing in which the process is continuous from a tile forming station to the completed product.

These and other objects and advantages of this invention will become more apparent upon reference to the following description, taken in connection with the accompanying drawings, in which:

Figure 1 is a perspective view showing a panel such as a wallboard having a ceramic tile facing;

Figure 2 is a sectional view, indicated by line 2—2 on Figure 1, showing the tile facing bonded directly to the backing sheet;

Figure 3 is a fragmentary rear elevational view of the panel of Figures 1 and 2, showing how a coating of adhesive could be applied thereto for fixing it to a wall;

Figure 4 is a schematic sectional view showing an extruding press adapted for pugging and de-airing and extruding the clay in a form suitable for being shaped into individual tiles or an embossed panel simulating individual tiles;

Figure 5 is a rather diagrammatic perspective view showing the production of the panel of Figure 1 according to one embodiment of my invention;

Figure 6 is a rather diagrammatic perspective view showing the production of the panel of Figure 1 according to another embodiment of my invention;

Figure 7 is also a more or less diagrammatic perspective view showing some of the steps making up the process of producing a panel having a tile facing where the tiles are individual members; and Figure 8 is a sectional view showing the wallboard product which is manufactured according to the process illustrated in Figure 7.

Referring to the drawings somewhat more in detail, Figure 1 shows a wallboard or like panel consisting of a backing sheet 10 with a ceramic tile facing 12. The panel 10 may consist of wood, such as plywood or pressed wood, may be a composite material such as a Celotex board, or may be glass fiber resin-bonded, or any other suitable material sufficiently strong and rigid to support the tile facing and to permit bonding of the panel to a wall surface or connection thereof to studding or other suitable supporting means.

As will be seen in Figure 2, the ceramic tile facing 12 is bonded to backing sheet 10, as at 14, either by adhesive, or by an interlocking of the ceramic material with irregularities or a fibrous nap on the surface of the backing sheet. The composite article, where the backing sheet is of a material which will withstand the firing temperatures for the ceramic tile, may be passed through a kiln with the tile facing applied thereto, and in which case, there would be a direct integral bonding of the tile facing to the bonding sheet. In the case of wood or Celotex or other material for the backing sheet which would not withstand such temperatures, the tile facing would be secured to the backing sheet with suitable cement which could consist of a conventional tile cement or many of several well-known adhesives, preferably a permanent adhesive that becomes insoluble after having set-up, such as a casein glue or asphalt adhesive.

The composite article, consisting of backing sheet 10 and tile facing 12, is adapted for being secured into position to form either a floor surface or wall surface, and the article may be fastened in place by screws or nails, or, if placed against a continuous wall surface, by adhesive, such as is shown on the back of the article at 16 in Figure 3.

Figure 4 illustrates, more or less diagrammatically, a typical installation for preparing tile by extrusion of the clay preparatory to the formation thereof into tiles and the firing thereof. In Figure 4 a chamber 18 is adapted for receiving the clay material, which may be admixed at this time with water, and within the chamber is a shaft 20 having pugging knives 22 thereon which will advance the clay rightwardly and through the sealing station 24 consisting of sealing auger 26 into the evacuated chamber 28 having a vacuum connection at 30 through which air is withdrawn. In this chamber 28 the clay is preferably comminuted, and in this manner the airpockets within the clay are opened to release the air, so that when the clay falls against the extrusion auger 32, it is in practically air-free condition.

The extrusion auger 32 advances the clay rightwardly through the chamber 34 and out through a suitable extrusion nozzle 36, and at which time the clay is in condition for firing, except for the further forming thereof that may be necessary and the application of a glazing material or coloring material thereto, these steps being well-known and conventional in the art.

In Figure 5 I show one arrangement for producing the tile facing and applying it to a backing or support panel. In Figure 5 the clay is extruded, as at 38, and a cutter member 40 is provided for cutting off the strips of clay at the proper length, the actuation of cutter 40 being determined by a limit switch LS1.

The strips of clay are received on a conveyor 42 which advances each strip of clay from a position of alignment with the extrusion nozzle to a position beneath a forming member 44, also under the control of switch LS1 which is adapted to move downwardly and compress the clay on the conveyor which is, at this time, supported by the supporting table 46, so as to form the strip of clay to the proper pattern so that it will resemble tile.

The forming member 44 is illustrated as merely embossing the strip of clay, but it will be understood that it could actually divide the strip into individual tiles, if so desired.

Adjacent the end of conveyor 42 is a second conveyor 48 geared to the conveyor 42 by the gearing at 49, so that conveyor 48 operates more slowly than conveyor 42 and will, thus, receive the clay strips in side-by-side relation, as illustrated. The operation of the conveyors is also under the control of limit switch LS1, so that advancing movements of the conveyors will take place in steps during the interval that the forming member 44 and cutter member 40 are retracted.

The conveyor 48 delivers the clay strips in side-by-side relation to a support panel 50 which conveys the clay strips through a kiln, it being understood that the tile could be treated before or after firing in any suitable manner to provide for the desired color or glaze thereon.

Where the tile facing is to be placed on a backing sheet that will not withstand the firing temperature, the panel 50 becomes merely a conveyor member, but where the backing sheet is to consist of a glass fiber or other material that will withstand the firing temperature, the backing sheet itself can take the place of panel 50. A particularly advantageous composition for the backing sheet consists of matted or interwoven glass fibers, preferably bonded together by a heat resistant material, such as a silicone resin, and which resin will also serve as a bonding agent to bond the glass fibers to the tile facing, particularly if pressure is applied to the tile facing to press it against the backing sheet before it passes into the kiln 52.

Where the tile facing is conveyed through the kiln on support member 50, it is thereafter bonded to a backing sheet but where the backing sheet itself replaces the support panel, the workpiece that is removed from the kiln is completely finished and ready to be installed.

In Figure 6 I have shown a somewhat modified structure which has particular advantage in connection with the mounting of the tile facing on the back sheet before the firing of the tile. In Figure 6 the clay strips 54 are delivered in side-by-side relation onto a backing sheet 56 that is carried on conveyor 58, with limit switch LS2 controlling the reciprocation of the cutter member 60 for cutting off the ends of the clay strips and the energization of a drive motor 62 which operates through the Geneva mechanism 64 to advance the conveyor the width of one strip of clay for each period of energization of motor 62.

Conveyor 58 carries backing sheet 56 and the clay strips supported thereon over a support table 66 which is located beneath a forming member 68 that is moved downwardly against the clay facing with sufficient force to form it into individual tiles, or to form an embossed simulated tile pattern, while simultaneously pressing the clay into bonding or interlocking relation with the backing sheet 56.

After the forming step the composite panel is then conveyed through the kiln, receiving such treatment before going into the kiln or after being removed therefrom as may be desired to provide the tile facing with the proper color and finish.

In Figure 7 I show an arrangement whereby individual squares of clay 70, which may have been formed by an extrusion process or by compacting granular material, are placed on a conveyor 72 and conveyed through a kiln 74 to emerge therefrom as individual tiles 75. These individual tiles, which may actually be produced according to conventional and well-known methods, are then placed on a backing sheet 76 and connected thereto, as will be seen in Figure 8, by a grout or adhesive 78 in much the same manner as individual tiles are now secured to floor surfaces and walls.

The composite atrticle of Figure 8 is then cleaned and dried and the final product is a wall or floor panel ready for installation in the same manner as previously described in connection with the other composite articles manufactured according to my invention.

From the foregoing, it will be seen that what I provide by this invention is a manner of utilizing economical mass production methods for producing a high-quality ceramic tile product suitable for floor and wall surfaces and the like, which will save time and costs in the erection of building structures, and which will, itself, due to the manufacturing procedures followed, be no more costly than quality ceramic tile products that are now known.

An advantage of the present invention resides in the fact that the tile facing of the composite article of the present invention can be made thinner than conventional ceramic tiles, particularly where used as a wall covering, and in this case the cost of covering a wall area with the ceramic wallboard according to the present invention will be considerably cheaper than covering the same wall area according to conventional tilting practices.

It will be understood that while I have shown only a flat wall panel, it is also contemplated to produce according to my invention coving strips, filets, corner and edge strips, and panels, integral with such formations so that a complete tiling installation can be made with a minimum of manual labor being required at the job site.

It will be understood that where the tile is fired directly on the supporting backing sheet, the backing sheet must be selected so as to have substantially the same shrinkage as the tile in order to prevent the tile from cracking loose during the firing operation, and also to prevent cracks from forming between the adjacent rows of tiles.

In a case where the tile is fired separately and later attached to the backing sheet considerably more latitude as to the material employed for the backing sheet is permissible.

It will also be understood that, inasmuch as there will be a certain number of tiles that will become scrap in passing through the kiln, it is preferred to fire extra tile at the same time that a panel of tile is being fired so that defective tiles can readily be replaced in order to prevent the loss of an entire panel due to defective tile therein.

It will be understood that this invention is susceptible to modification in order to adapt it to different usages and conditions, and, accordingly, it is desired to comprehend such modifications within this invention as may fall within the scope of the appended claims.

I claim:

1. In an apparatus for making a building panel; means for applying unfired ceramic material to a panel, a forming member for pressure shaping the material to the desired tile form on the panel while simultaneously effecting a bonding of the material to the panel, and means for firing the material while on the panel to form a building panel having an integral ceramic facing thereon.

2. In an apparatus for making a building panel, a belt conveyor for supporting a backing member, a chamber mounted laterally of said conveyor and containing unfierd ceramic material, means for dispensing ceramic material from said chamber onto said backing member, a forming member to press the ceramic material into bonding relation with said backing sheet, and a kiln receiving said backing member of the ceramic bonded thereto for firing the ceramic to form a building panel with an integral ceramic face.

3. In an apparatus for making a building panel, a first conveyor belt for supporting a backing member, second conveyor belt means above said first belt for supporting ceramic material and delivering the material to said first belt, means for dispensing unfired ceramic material onto said second conveyor belt means, forming means for embossing the ceramic material on said second conveyor belt means, said embossed ceramic material being delivered onto said backing member on said first conveyor belt, and a kiln receiving said first conveyor belt with said backing member and ceramic material to fire the same concurrently and to form a building panel having an integral ceramic face thereon.

4. In an apparatus for making a building panel; means for dispensing strips of unfired ceramic material onto a panel of fibrous material so as to cover the panel, means for supporting the panel, a forming member for pressing the material into the desired tile form while effecting a bonding of the material to the panel, and means for firing the material and panel conveniently to form a building panel having an integral ceramic facing.

References Cited in the file of this patent

UNITED STATES PATENTS

| | | |
|---|---|---|
| 572,454 | Shelmerdine | Dec. 1, 1896 |
| 627,378 | Alexander | June 20, 1899 |
| 653,252 | Lawton et al. | July 10, 1900 |
| 756,971 | Leighton | Apr. 12, 1904 |
| 916,827 | Bangs | Mar. 30, 1909 |
| 1,163,448 | Penkala | Dec. 7, 1915 |
| 1,701,454 | Knowlton | Feb. 5, 1929 |
| 1,796,272 | Stanbrough | Mar. 10, 1931 |
| 1,941,403 | Lansing | Dec. 26, 1933 |
| 1,968,189 | Bartels | July 31, 1934 |
| 2,049,428 | Denk | Aug. 4, 1936 |
| 2,418,650 | Mackey | Apr. 8, 1947 |
| 2,625,730 | Cremer | Jan. 20, 1953 |
| 2,667,664 | Ferrell | Feb. 2, 1954 |
| 2,680,319 | Dratler | June 8, 1954 |

FOREIGN PATENTS

| | | |
|---|---|---|
| 24,278 | Great Britain | A. D. 1897 |